United States Patent
An et al.

(10) Patent No.: US 11,285,868 B1
(45) Date of Patent: Mar. 29, 2022

(54) PUDDLE LAMP DEVICE FOR DISPLAYING IMAGE

(71) Applicants: Hyundai Motor Company, Seoul (KR); Kia Motors Corporation, Seoul (KR); Optrontec Co., Ltd, Gyeongsangnam-do (KR)

(72) Inventors: Seon-Yong An, Chuncheon-si (KR); Kyoung-Chun Kweon, Seoul (KR); Dai-Ho Cho, Yongin-si (KR); Sung-Hwan Lee, Yongin-si (KR); Woo-Suk Choi, Seongnam-si (KR)

(73) Assignees: Hyundai Motor Company, Seoul (KR); Kia Motors Corporation, Seoul (KR); Optrontec Co., Ltd, Changwon-si (KR)

( * ) Notice: Subject to any disclaimer, the term of this patent is extended or adjusted under 35 U.S.C. 154(b) by 0 days.

(21) Appl. No.: 17/142,485

(22) Filed: Jan. 6, 2021

(30) Foreign Application Priority Data

Sep. 7, 2020 (KR) .......................... 10-2020-0113875

(51) Int. Cl.
| | | |
|---|---|---|
| *B60Q 1/50* | (2006.01) | |
| *B60Q 1/32* | (2006.01) | |
| *F21V 5/00* | (2018.01) | |
| *F21S 41/25* | (2018.01) | |
| *F21W 104/00* | (2018.01) | |

(52) U.S. Cl.
CPC .............. *B60Q 1/503* (2013.01); *B60Q 1/32* (2013.01); *F21S 41/25* (2018.01); *F21V 5/008* (2013.01); *B60Q 2400/50* (2013.01); *F21W 2104/00* (2018.01)

(58) Field of Classification Search
CPC . B60Q 2400/50; F21S 41/25; F21W 2104/00; G02B 13/0035; G02B 9/12
See application file for complete search history.

(56) References Cited

U.S. PATENT DOCUMENTS 6,072,634 A * 6/2000 Broome ................. G02B 7/021
                                                                      359/637
10,302,922 B2   5/2019 McClelland et al.
(Continued)

FOREIGN PATENT DOCUMENTS

| EP | 2184624 A1 | 12/2010 |
|---|---|---|
| EP | 3202815 A1 | 9/2017 |

(Continued)

OTHER PUBLICATIONS

Search Report dated Jun. 25, 2021, in European Patent Appl'n No. 21150382.

*Primary Examiner* — Zheng Song
(74) *Attorney, Agent, or Firm* — Morgan, Lewis & Bockius LLP

(57) ABSTRACT

A puddle lamp device configured for displaying an image may include a housing; and an illumination system lens, an image film, and a plurality of image forming system lenses embedded in the housing, and sequentially arranged in one direction thereof, in which at least one image forming system lens among the plurality of image forming system lenses is made of a cycloolefin polymer (COP) material, and the present invention may make an image to be displayed clearer while performing a function of a puddle lamp, thereby improving the resolution.

14 Claims, 14 Drawing Sheets

(56) References Cited

U.S. PATENT DOCUMENTS

| | | | |
|---|---|---|---|
| 10,830,410 B1* | 11/2020 | Wei ......................... | F21V 11/16 |
| 2006/0203476 A1* | 9/2006 | Chapman ................ | F21V 5/048 |
| | | | 362/157 |
| 2006/0256563 A1* | 11/2006 | Uke ....................... | G03B 15/06 |
| | | | 362/335 |
| 2009/0207327 A1 | 8/2009 | Terao | |
| 2011/0273671 A1* | 11/2011 | Chu ....................... | G03B 21/14 |
| | | | 353/13 |
| 2016/0356450 A1* | 12/2016 | McClelland ............. | B60Q 3/60 |
| 2017/0368985 A1 | 12/2017 | Yokoyama et al. | |
| 2019/0002178 A1 | 1/2019 | Tatarka | |
| 2019/0063711 A1* | 2/2019 | Tsai ..................... | F21S 41/285 |
| 2019/0111847 A1 | 4/2019 | Messenger et al. | |
| 2019/0121050 A1 | 4/2019 | Park | |
| 2019/0270403 A1* | 9/2019 | Sobecki ................. | G02B 7/021 |
| 2020/0189451 A1* | 6/2020 | Hellin Navarro .... | B60Q 1/2696 |
| 2021/0190275 A1* | 6/2021 | Hu ......................... | F21V 29/77 |

FOREIGN PATENT DOCUMENTS

| | | |
|---|---|---|
| EP | 3604440 A1 | 5/2020 |
| KR | 10-1360433 B1 | 9/2013 |
| KR | 10-2019-0042467 A | 4/2019 |

* cited by examiner

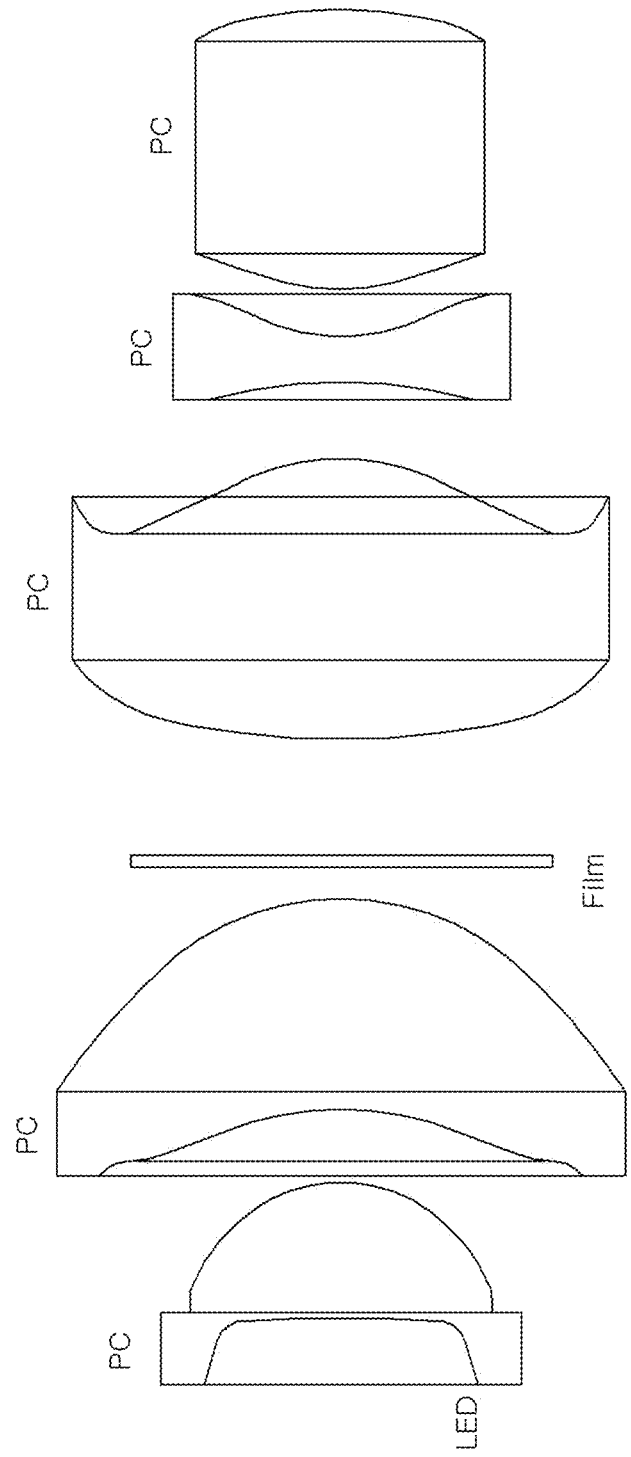

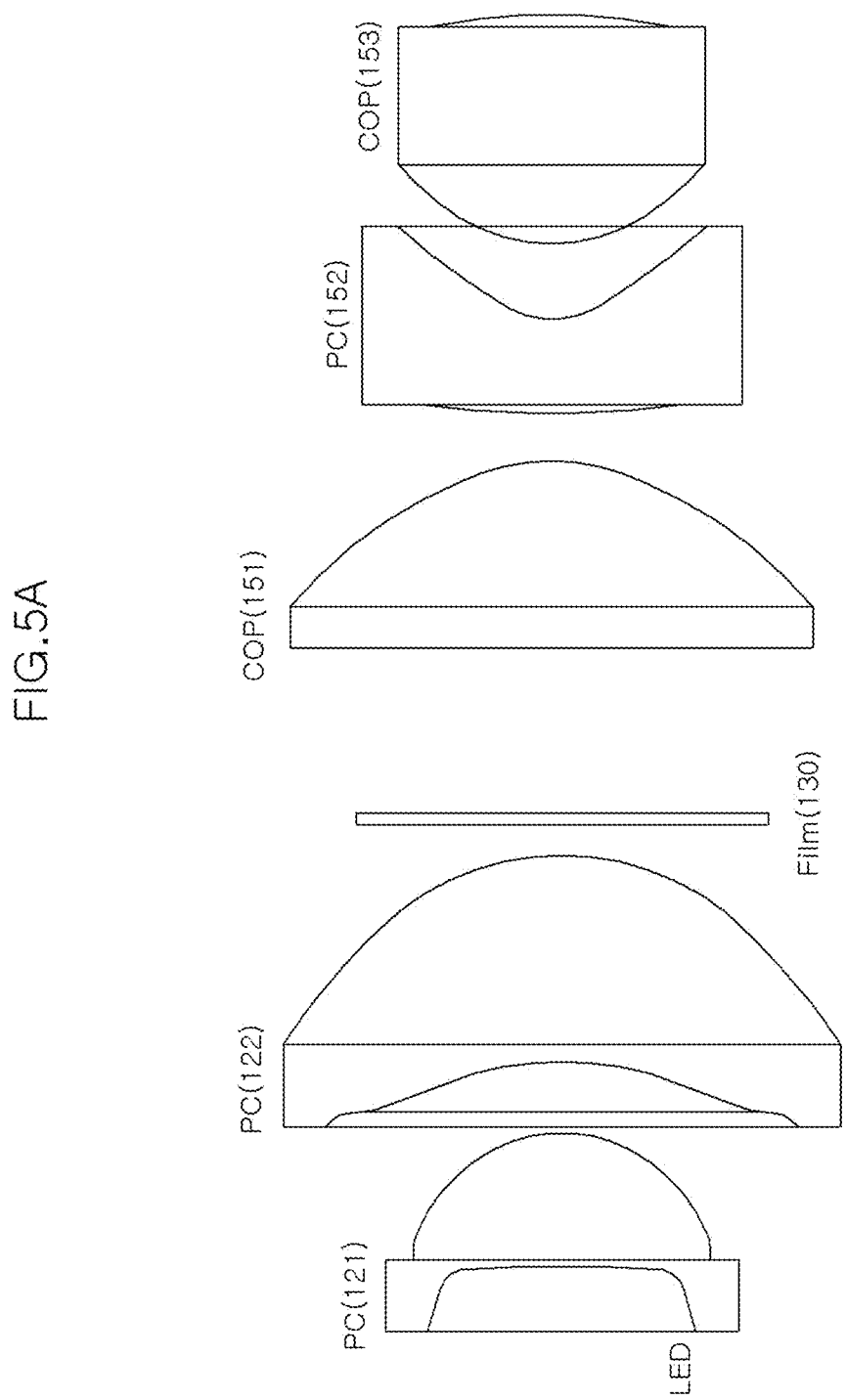

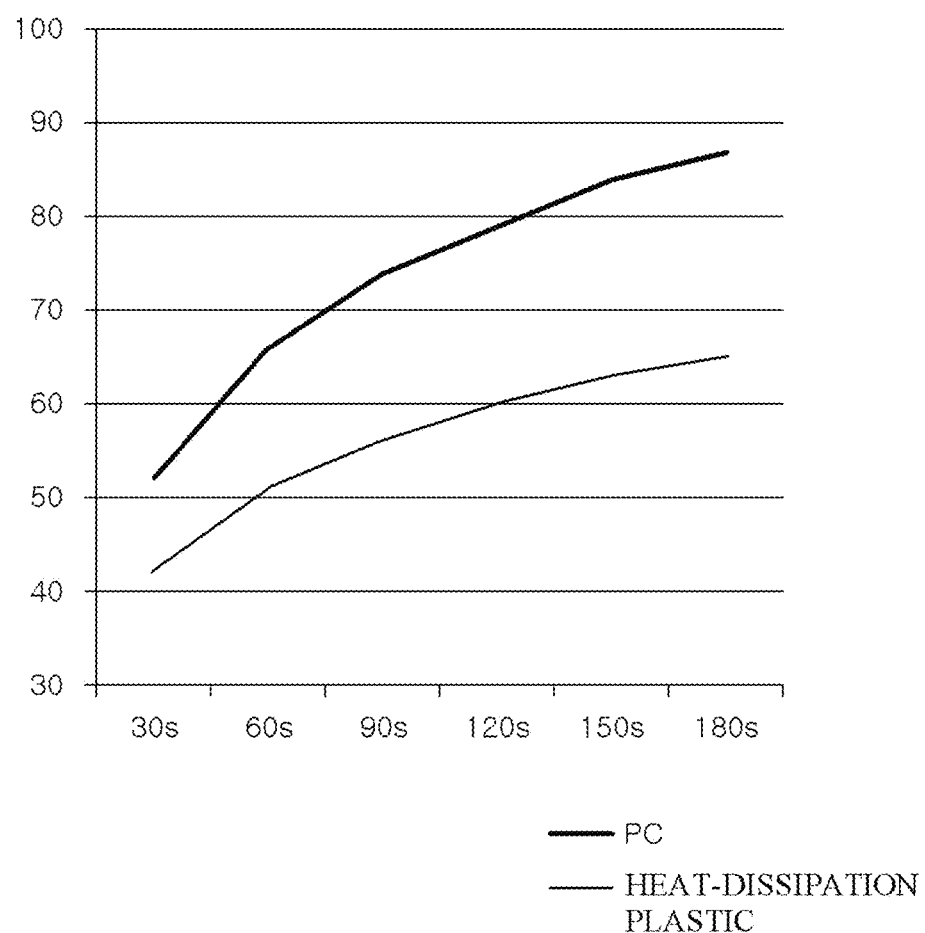

PUDDLE LAMP DEVICE FOR DISPLAYING IMAGE

CROSS-REFERENCE TO RELATED APPLICATION

The present application claims priority to Korean Patent Application No. 10-2020-0113875, filed on Sep. 7, 2020, the entire contents of which is incorporated herein for all purposes by this reference.

BACKGROUND OF THE PRESENT INVENTION

Field of the Invention

The present invention relates to a puddle lamp device for a vehicle, and particularly, to a puddle lamp device capable of displaying an image such as a vehicle logo image.

Description of Related Art

The present invention relates to a logo lamp for projecting a light pattern adjacently to a vehicle. That is, the logo lamp is mounted on the exterior of the vehicle such as a door or a side mirror to radiate an image on a floor region adjacent to the vehicle.

The logo lamp may include a mask configured for projecting an image logo pattern adjacently to the vehicle, and the logo lamp includes a normal lens, an image pattern mask, a housing, and a light source and optimizes a material and shape of the lens to radiate the logo image to the floor.

As an example of the related art, Korean Patent Application Laid-Open No. 10-2019-0042467 discloses a technology relating to the configuration and design of the assembly device configured for facilitating the replacement of the housing and the components within the logo lamp, and Korean Patent No. 10-1360433 discloses a technology relating to the logo lamp for displaying the unique logo of the vehicle on the floor while performing a function of the function of the puddle lamp, and they focus on the technology that fades the boundary between the region where the logo image is radiated to the floor and the non-radiation region, improving the high-quality image and merchantability of the vehicle.

However, all of two related arts have a limit to the resolution of the image.

The information included in this Background of the Invention section is only for enhancement of understanding of the general background of the invention and may not be taken as an acknowledgement or any form of suggestion that this information forms the related art already known to a person skilled in the art.

BRIEF SUMMARY

Various aspects of the present invention are directed to providing a puddle lamp device configured for displaying an image configured for making an image to be displayed cleaner while performing a function of a puddle lamp, improving the resolution.

A puddle lamp device configured for displaying an image according to various aspects of the present invention includes: a housing, and an illumination system lens, an image film, and a plurality of image forming system lenses embedded in the housing, and sequentially disposed in one direction thereof, in which at least one image forming system lens among the plurality of image forming system lenses is made of a cycloolefin polymer (COP) material.

Here, the at least one image forming system lens among the plurality of image forming system lenses is made of a polycarbonate (PC) material.

Furthermore, the plurality of image forming system lenses are three or more image forming system lenses, and the plurality of image forming system lenses include: two or more image forming system lenses made of a COP material.

The plurality of image forming system lenses include: a first image forming system lens, a second image forming system lens, and a third image forming system lens sequentially disposed in a direction away from the image film, in which the first image forming system lens is made of a cycloolefin polymer (COP) material.

Furthermore, the second image forming system lens is made of a PC material, and the third image forming system lens is made of a cycloolefin polymer (COP) material.

Furthermore, the plurality of image forming system lenses are three or more image forming system lenses, and the plurality of image forming system lenses include: two or more image forming system lenses made of a polycarbonate (PC) material.

Meanwhile, the illumination system lens is arranged with a plurality of illumination system lenses made of a polycarbonate (PC) material.

Furthermore, the puddle lamp device configured for displaying the image may further include: a spacer disposed between the illumination system lens and the plurality of image forming system lenses, and having the image film accommodated thereon.

Here, the spacer is formed with a rim portion extending from an external circumference of the spacer, the illumination system lens is formed with a spacer portion extending upwards from an external circumference of the illumination system lens, and the spacer portion is inserted into the rim portion.

Furthermore, the puddle lamp device configured for displaying the image may further include a spacer disposed between the illumination system lens and the plurality of image forming system lenses, and having the image film accommodated thereon, in which an opening is formed in a side surface of the housing, and the opening is formed at a location at which the spacer is configured to be separated from the housing.

Furthermore, the housing is made of a heat-dissipation plastic material to which a carbon-based additive is added.

Next, a puddle lamp device configured for displaying the image according to another aspect of the present invention includes: a housing, and an illumination system lens, an image film, and a plurality of image forming system lenses embedded in the housing, and sequentially disposed in one direction thereof, in which the plurality of image forming system lenses include: at least one image forming system lens having an Abbe's number different from an Abbe's number of other image forming system lenses among the plurality of image forming system lenses.

Furthermore, the plurality of image forming system lenses include: an image forming system lens made of a polycarbonate (PC) material and an image forming system lens made of a cycloolefin polymer (COP) material.

Here, the plurality of image forming system lenses include: two or more image forming system lenses made of a cycloolefin polymer (COP) material.

Furthermore, the plurality of image forming system lenses include: a first image forming system lens, a second image forming system lens, and a third image forming system lens sequentially disposed in a direction away from the image film, and the first image forming system lens is made of a cycloolefin polymer (COP) material.

Furthermore, the second image forming system lens is made of a polycarbonate (PC) material, and the third image forming system lens is made of a cycloolefin polymer (COP) material.

Furthermore, the housing is made of a heat-dissipation plastic material to which a carbon-based additive is added.

Furthermore, the puddle lamp device configured for displaying the image may further include a spacer disposed between the illumination system lens and the plurality of image forming system lenses, and having the image film accommodated thereon, in which an opening is formed in a side surface of the housing, and the opening is formed at a location at which the spacer is configured to be separated from the housing.

The puddle lamp device configured for displaying the image according to various exemplary embodiments of the present invention may allow the image or the logo to be displayed to have the clear high resolution without chromatic aberration due to the combination of the lens materials having different Abbe's numbers.

Furthermore, it is possible to secure the heat-dissipation performance by the housing made of the heat-dissipation plastic material even without using the housing made of the expensive metallic material and the heat sink.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3A illustrates a configuration of a lens in a Comparative Example 1.

FIG. 5A illustrates a configuration of a lens according to various exemplary embodiments of the present invention.

FIG. 7, FIG. 8A, and FIG. 8B illustrate the heat-dissipation evaluations of a housing made of a heat-dissipation plastic material and a housing made of a PC material.

Figure 1:
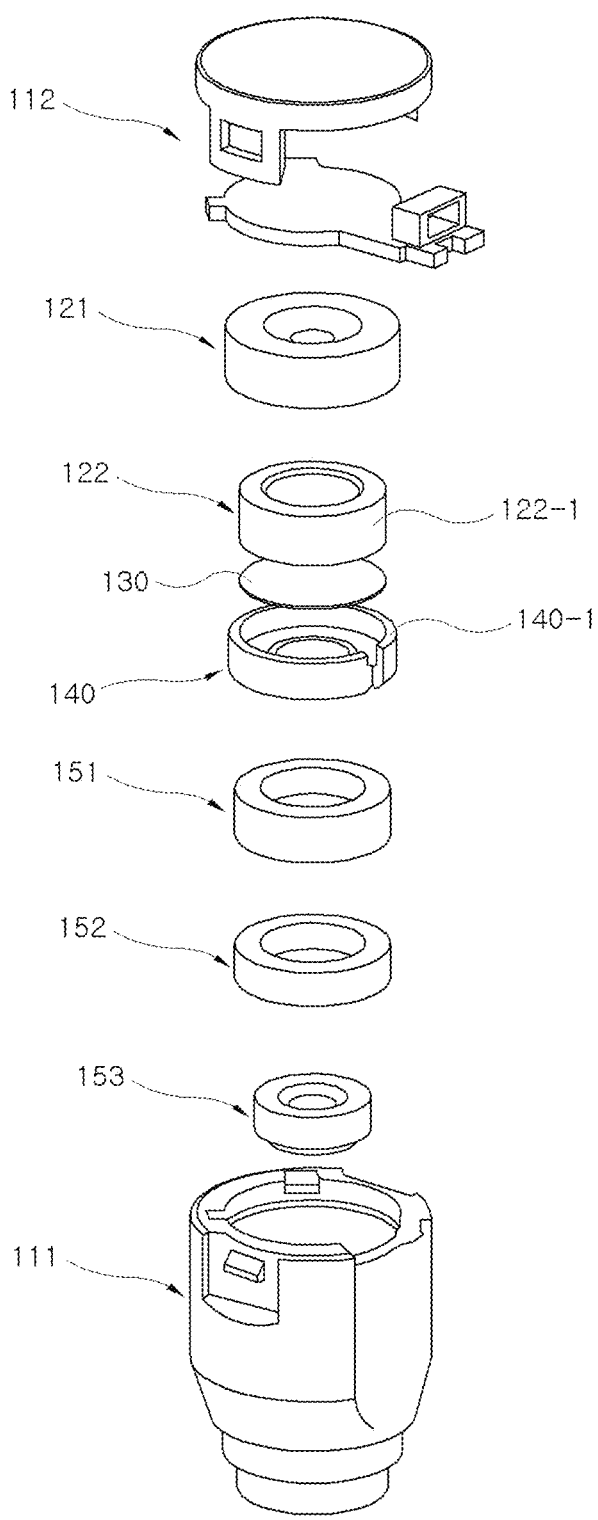
FIG. 1 is an exploded diagram illustrating a puddle lamp device configured for displaying an image according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

To fully understand the present invention, operational advantages of the present invention, and objects achieved by the implementation of the present invention, reference may be made to the accompanying drawings illustrating exemplary embodiments of the present invention and the contents described in the accompanying drawings.

In describing the exemplary embodiments of the present invention, the description of known techniques or repetitive descriptions which may unnecessarily obscure the gist of the present invention will be reduced or omitted.

Figure 2:
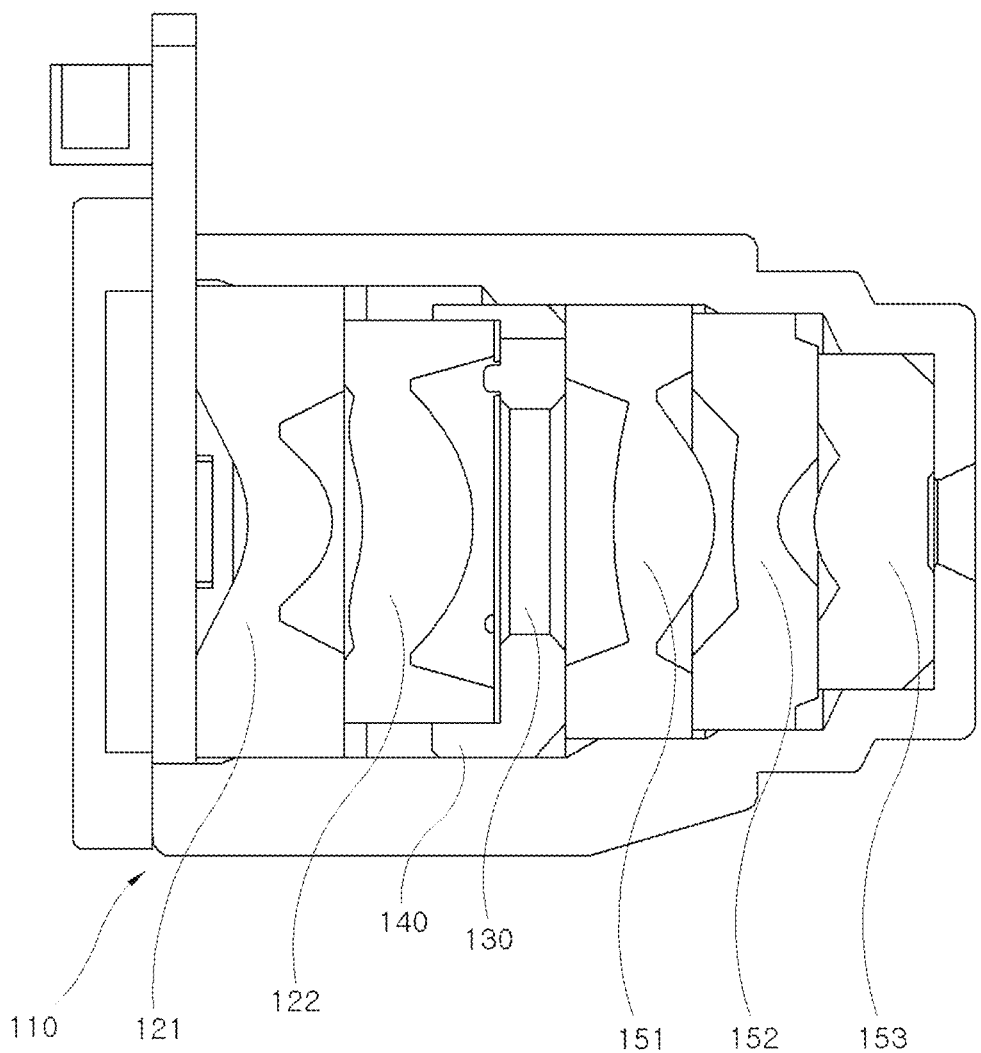
FIG. 2 illustrates a side cross-sectional shape of the puddle lamp device configured for displaying the image according to various exemplary embodiments of the present invention.

FIG. 1 is an exploded diagram illustrating a puddle lamp device configured for displaying an image according to various exemplary embodiments of the present invention, and FIG. 2 illustrates a side cross-sectional shape of the puddle lamp device configured for displaying the image according to various exemplary embodiments of the present invention.

Hereinafter, a puddle lamp device configured for displaying an image according to various exemplary embodiments of the present invention will be described with reference to FIG. 1 and FIG. 2.

Various aspects of the present invention provide a puddle lamp device mounted on the exterior of a vehicle such as a door or a side mirror to illuminate an image on a floor region adjacent to a vehicle, and the puddle lamp device may accommodate an illumination system lens, an image film, and an image forming system lens within a housing 110 such that the shape of the image film may be displayed on the exterior of a vehicle by the light from a light source.

A plurality of lenses are combined within the puddle lamp device, and the present invention is characterized in that a plurality of image forming system lenses are made of a combination of the materials having different Abbe's numbers unlike applying only the lens made of one material within the conventional logo lamp.

The Abbe's number is a number representing the property about the distribution of the light of a transparent medium, and as the Abbe's number increases, less chromatic aberration appears.

As before, chromatic aberration occurs in the image displayed by the lens made of one material, and the resolution is lowered, whereas the present invention may use mixed lenses in the imaging system, having the shape of the image and the logo with the clear high resolution without chromatic aberration.

The housing 110 includes a barrel 111 and a cap 112, a light source is disposed between the barrel 111 and the cap 112, and lenses are disposed in the internal space of the barrel 111.

That is, the housing 110 is configured such that a PCB having the light source mounted on one end portion of the barrel 111 is coupled, and light is radiated through a radiation port of the other end portion thereof.

The lens may be disposed in the order of an illumination system lens, an image film 130, and an image forming system lens toward the radiation port from the light source, and a plurality of illumination system lenses may be configured.

In various exemplary embodiments of the present invention, a first illumination system lens 121 and a second illumination system lens 122 are sequentially disposed. The first illumination system lens 121 and the second illumination system lens 122 may be made of a polycarbonate material.

Furthermore, a spacer 140 may be configured between the illumination system lens and the image forming system lens to dispose and separate the image film 130.

Furthermore, as illustrated, the spacer 140 may be formed with a rim portion 141-1 extending downwardly from the circumference thereof, disposed such that the second illumination system lens 122 is inserted into the rim portion, and configured such that the image film 130 is accommodated and supported.

That is, the plurality of lenses are laminated and arranged, the second illumination system lens 122 may be formed with a spacer portion 122-1 vertically extending from the circumference thereof to be coupled with the spacer 140 as illustrated, and other laminated lenses may also be formed with the spacer portion to facilitate the lamination assembly.

Next, a plurality of image forming system lenses may be sequentially arranged and three or more lenses may be provided, and according to various exemplary embodiments of the present invention, for example, the image forming system lens has a first image forming system lens 151, a second image forming system lens 152, and a third image forming system lens 153 sequentially arranged.

The three or more image forming system lenses may include an image forming system lens made of a COP material.

The COP has the Abbe's number greater than that of the PC material, as a cycloolefin polymer.

That is, the image forming system lens includes a combination of the image forming system lens made of the COP material and the image forming system lens made of the PC material to adjust all of the Abbe's numbers such that less chromatic aberration occurs.

Furthermore, a plurality of image forming system lenses made of the COP material or a plurality of image forming system lenses made of the PC material may be arranged, and a plurality of image forming system lenses made of the COP material may be arranged.

According to various exemplary embodiments of the present invention, for example, the image forming system lens is configured for a combination of two lenses made of the COP material and one lens made of the PC material.

Furthermore, for example, the first image forming system lens 151 is made of the COP material, the second image forming system lens 152 is made of the PC material, and the third image forming system lens 153 is made of the COP material in the order closer to the light source.

If the image forming system lenses made of two COP materials and the image forming system lens made of one PC material are arranged, it is possible to reduce the chromatic aberration even in the case of being arranged in the order of COP-COP-PC or arranged in the order of PC-COP-COP, but the case of being arranged in the order of COP-PC-COP is more effective as in the exemplary embodiment of the present invention.

Hereinafter, the present invention will be described in more detail through the comparison with a Comparative Example and an optical simulation.

Figure 3B:
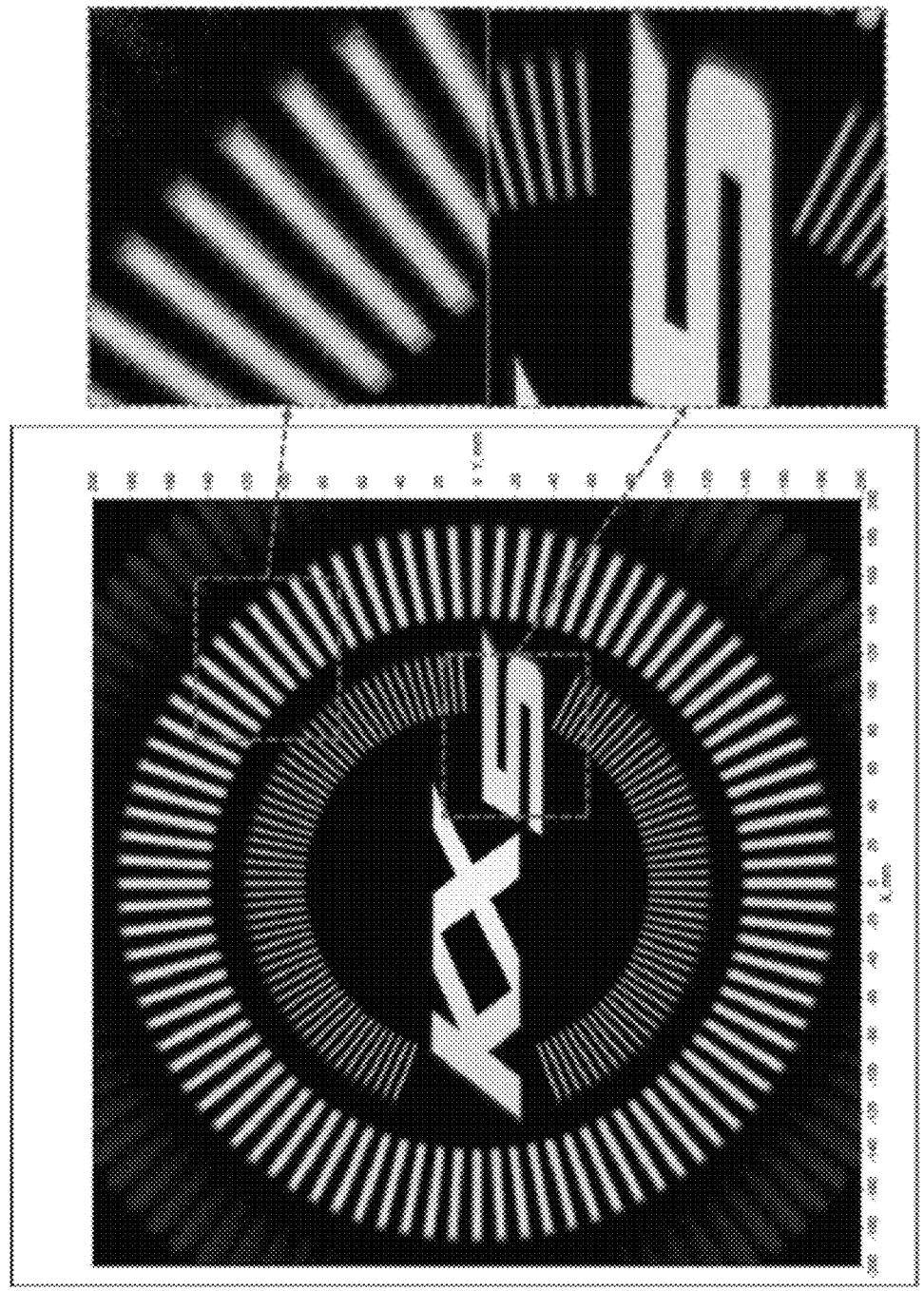
FIG. 3B illustrates a display image according to the Comparative Example 1.
Figure 4A:
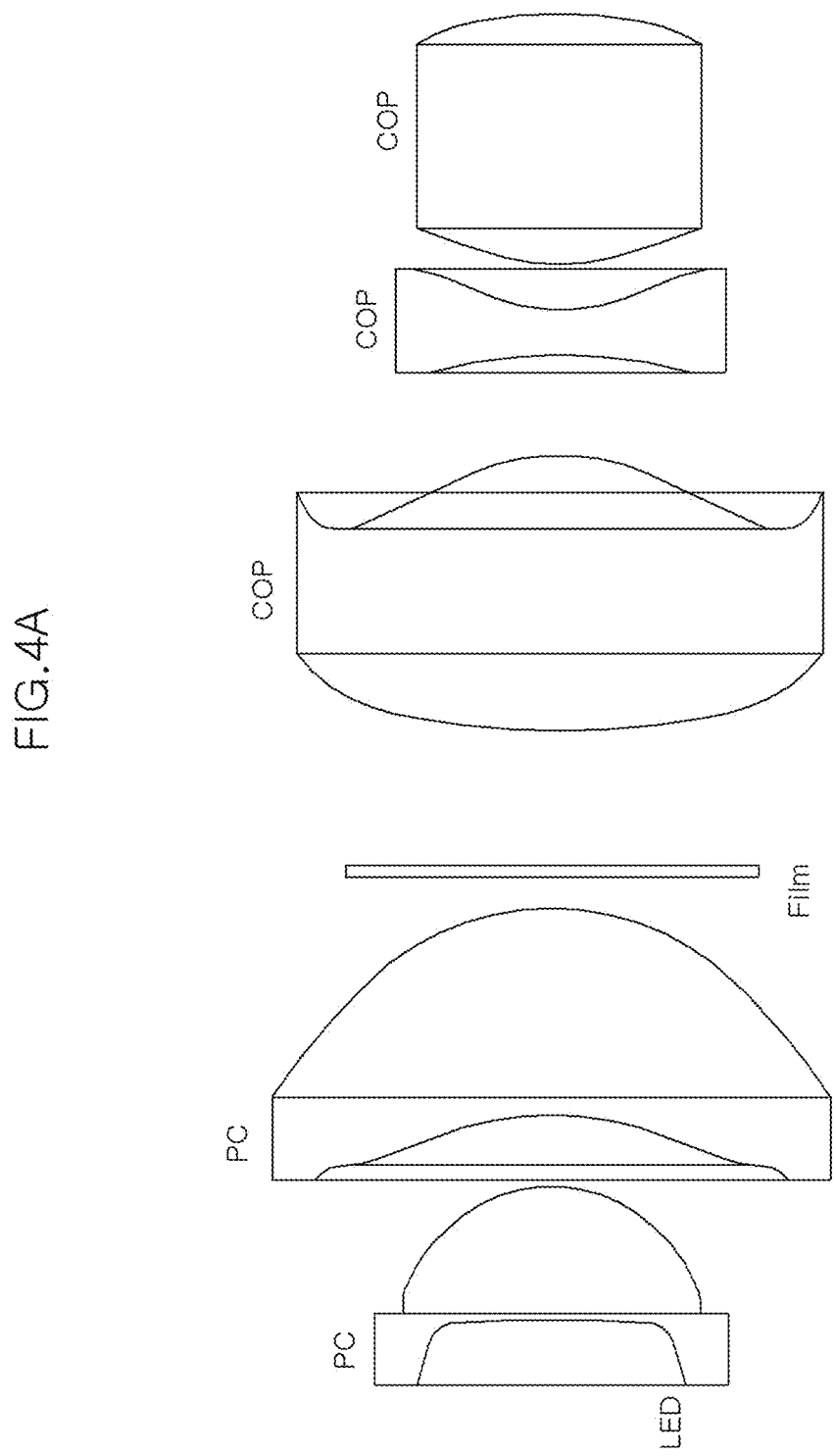
FIG. 4A illustrates a configuration of a lens in a Comparative Example 2.
Figure 4B:
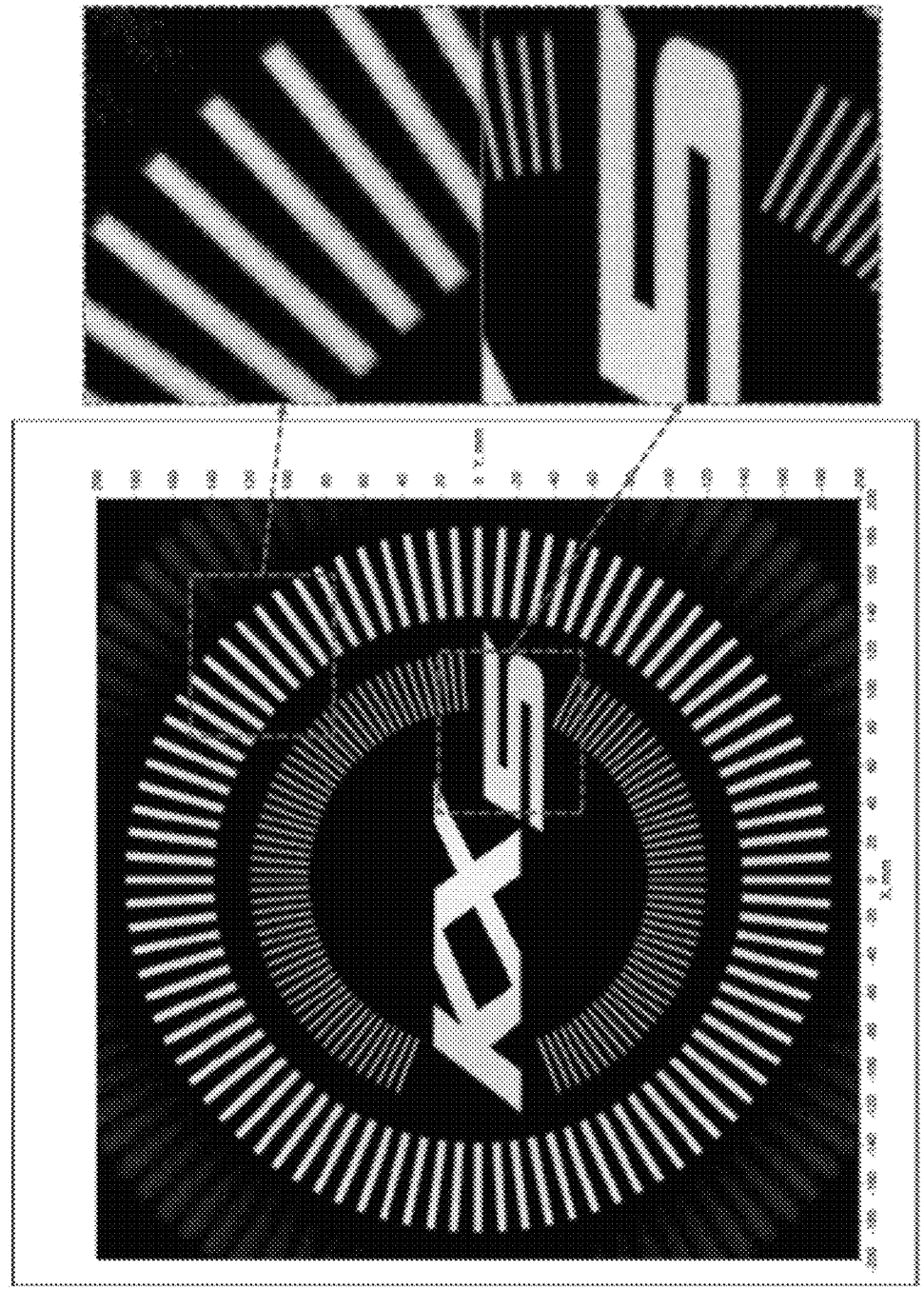
FIG. 4B illustrates a display image according to the Comparative Example 2.

Comparative Example 1 illustrated in FIG. 3A and FIG. 3B is the result of having performed the optical simulation using a PC single material mainly used for the conventional logo lamps, and Comparative Example 2 illustrated in FIG. 4A and FIG. 4B is the simulation result of the lamp using the lens made of only the COP material which is a more expensive material than the PC but has a better injectability than the PC and thus is commonly used for a precision structure.

Both Comparative Examples 1, 2 use the single material to have different degrees of color dispersion according to the unique Abbe's number owned by the material, varying the degree of chromatic aberration.

The PC material used in Comparative Example 1 has a small Abbe's number of about 23 to 35 and is classified into a NEGATIVE type. The COP used in the Comparative Example 2 has a large Abbe's number of about 45 to 58 and is classified into a POSITIVE type.

As the Abbe's number is larger, the color dispersion is smaller, and as the Abbe's number is smaller, the color dispersion is larger.

Figure 5B:
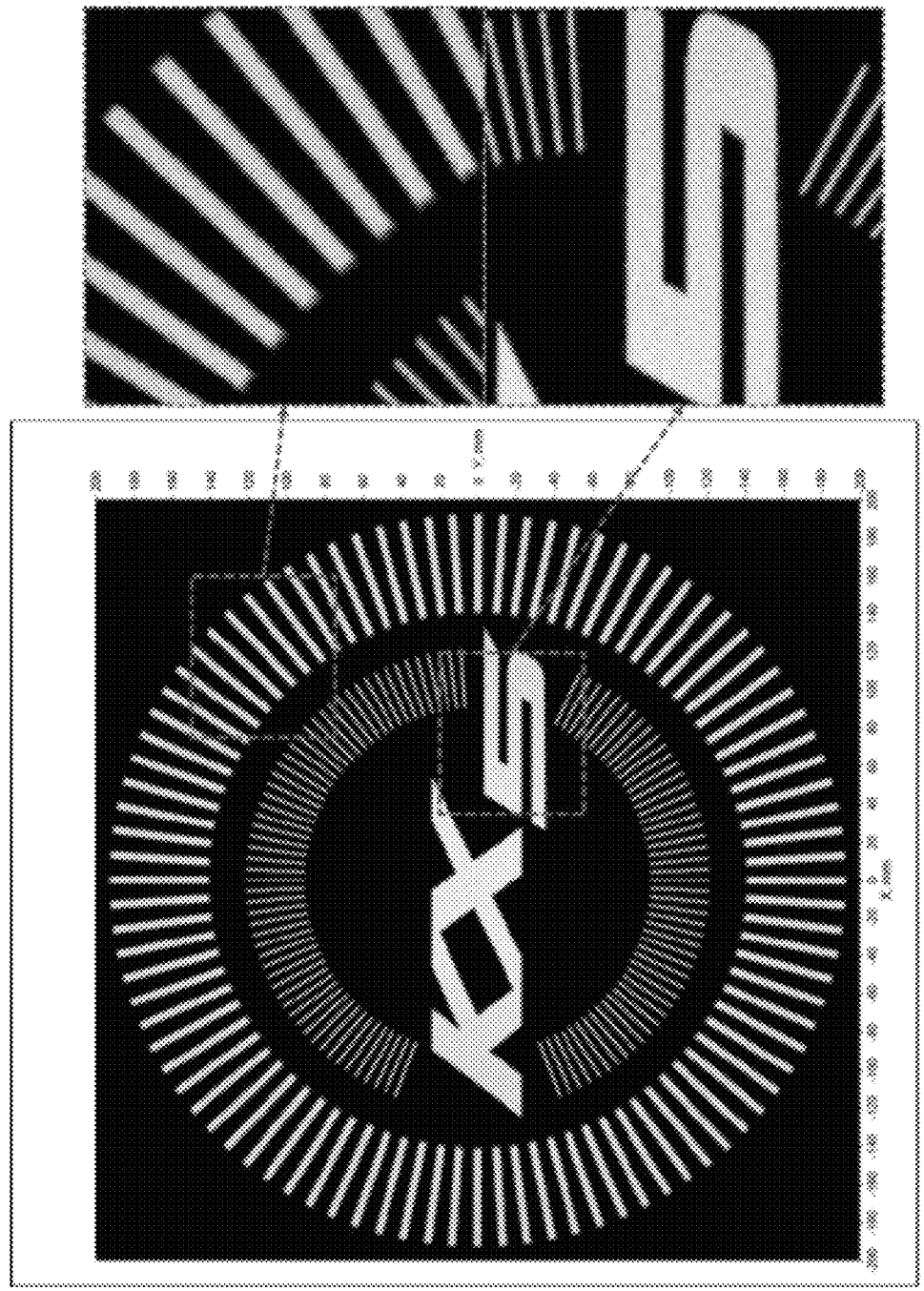
FIG. 5B illustrates a display image according to the exemplary embodiment of the present invention.

Therefore, the image in Comparative Example 2 using the COP having a large Abbe's number has less chromatic aberration than the image in the Comparative Example 1. There is a method for reducing the chromatic aberration using the material having a larger Abbe's number, but it is good to use the material having the dispersion advantageous in different lens forms. When a combination of two materials having different Abbe's numbers is used, the high resolution lamp with little chromatic aberration may be manufactured as in an exemplary embodiment 1 illustrated in FIG. 5A and FIG. 5B. At the instant time, in a combination of the image forming system lens, the under-corrected chromatic aberration occurs in the POSITIVE type lens, and the chromatic aberration is over-corrected in the NEGATIVE type lens. The POSITIVE type lens utilizes the POSITIVE type material having a low color dispersion and the NEGATIVE type lens utilizes the NEGATIVE type material having a high color dispersion by combining the POSITIVE lens and the NEGATIVE lens having a dioptric power smaller than that of the POSITIVE lens such that the chromatic aberrations of two lenses balance each other and disappear.

Furthermore, the present invention utilizes the heat-dissipation plastic as the material of the housing 110 to prevent the resolution from being lowered due to heat generation, securing heat-dissipation performance even without using the housing made of an expensive metallic material and a heat sink, and implementing the high resolution image.

Figure 6:
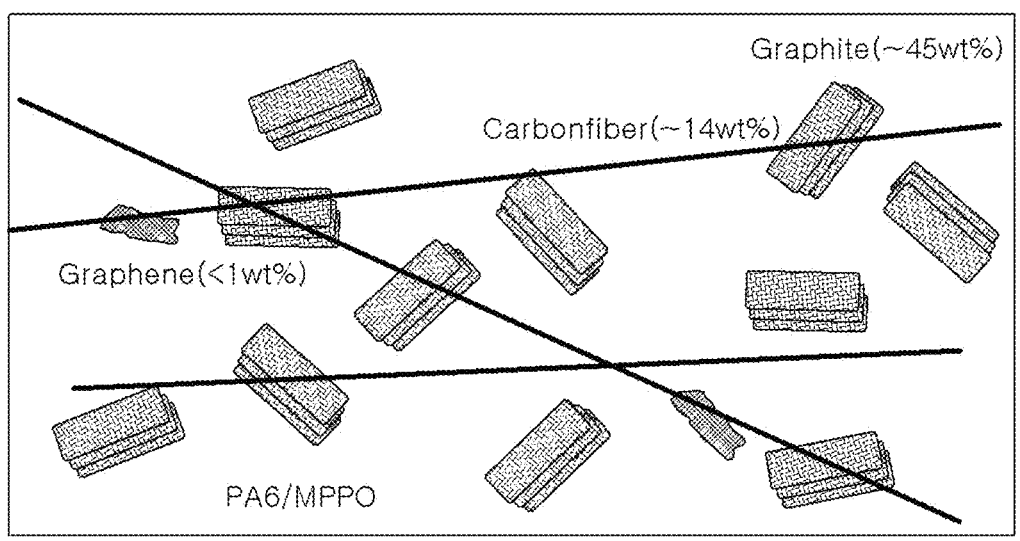
FIG. 6 is a schematic diagram illustrating heat conduction of a heat-dissipation plastic material.
Figure 8A:
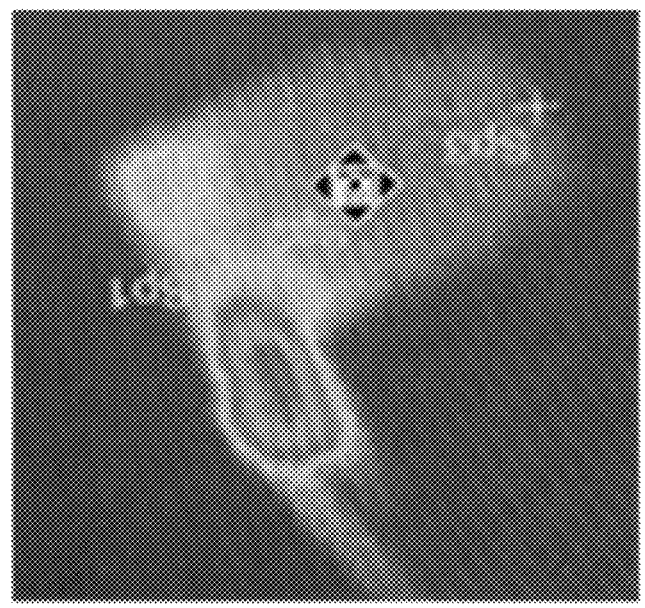
Figure 8B:
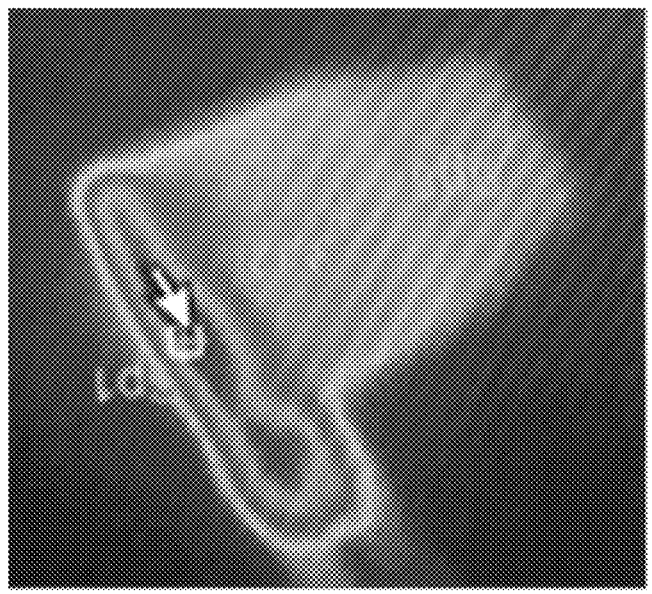

FIG. 6 is a schematic diagram of heat conduction of a heat-dissipation plastic material, and FIGS. 7, 8A, and 8B illustrate heat-dissipation evaluations of a housing made of a heat-dissipation plastic material and a housing made of a PC material.

Comparative Example 1 is a sample in which the housing (barrel and cap) is manufactured using the PC material mainly used for the conventional logo lamps. An exemplary embodiment 1 is a sample in which a housing made of a heat-dissipation plastic material having heat-dissipation performance equivalent to the metal material such as aluminum is manufactured.

As illustrated in FIG. 6, the heat-dissipation plastic is a material whose heat conductivity is significantly improved by a material adding graphene, graphite, carbon fiber, or the like, which is a carbon-based additive having the high conductivity, to a plastic base material called PA6 unlike the conventional PV material.

FIG. 7 illustrates a graph of evaluating an LED junction temperature inside the lamp device and the image result of a thermal image camera, in which actual performance of a case of applying the housing made of the PC material and a case of applying the housing made of the heat-dissipation plastic material having heat-dissipation performance equivalent to the metallic material such as aluminum may be shown.

As may be confirmed from the evaluation of the LED junction temperature, the LED junction temperature of the logo lamp using the heat-dissipation plastic is lower than that of the logo lamp using a general PC material by about 10 to 20° C., and this may be regarded as preventing the damage to the LED and emitting a lot of heat from the inside.

Furthermore, as may be seen from the images of the thermal image camera by the PC material illustrated in FIG. 8A and the heat-dissipation plastic material illustrated in FIG. 8B, it may be seen that if the heat-dissipation plastic is to be used, a lot of heat is entirely emitted, minimizing the heat existing within the logo lamp.

This result is important because all materials have a thermal expansion coefficient and the degree of expansion is different at high temperature, and when the plastic lens expands at high temperature, the numeric value of the lens is wrong and thus the resolution is reduced such that the heat-dissipation characteristics configured for emitting the internal heat well from the logo lamp are very important factor.

Figure 9A:
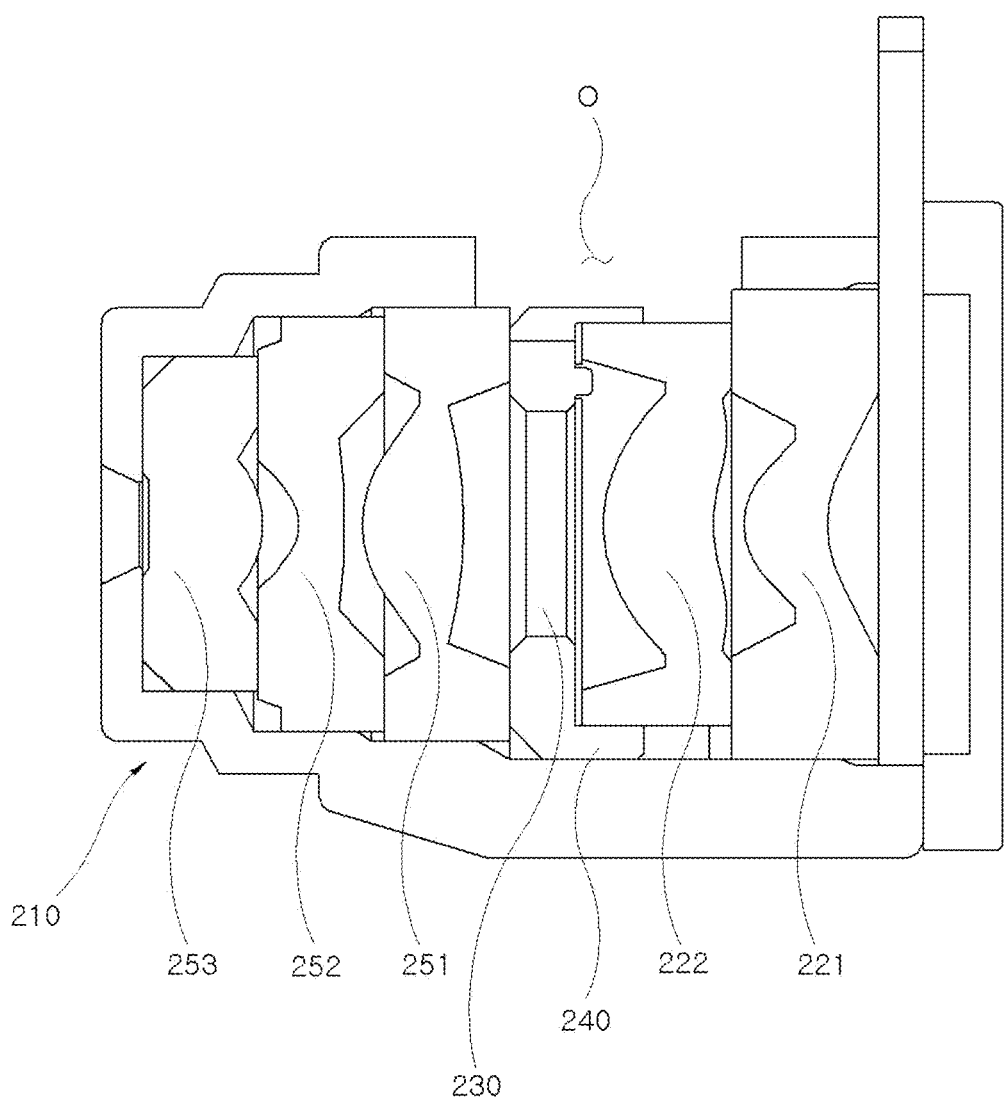
FIG. 9A illustrates a side cross-sectional shape of a puddle lamp device configured for displaying an image according to the application example of the present invention.
Figure 9B:
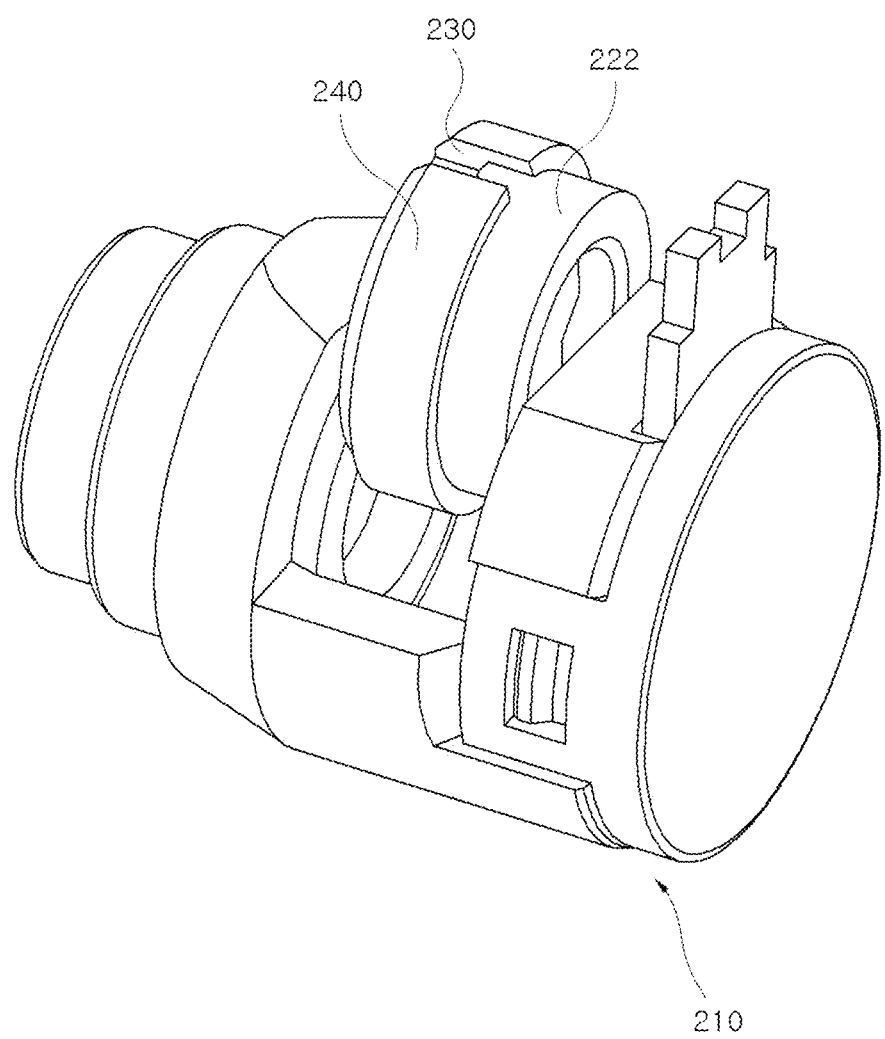
FIG. 9B is a perspective diagram illustrating the puddle lamp device configured for displaying the image according to the application example of the present invention.

Subsequently, FIG. 9A illustrates a side cross-sectional shape of a puddle lamp device configured for displaying an image according to an application example of the present invention, and FIG. 9B is a perspective diagram illustrating the puddle lamp device configured for displaying the image according to the application example of the present invention.

As in the aforementioned exemplary embodiment of the present invention, the application example (puddle lamp device configured for displaying the image) includes a housing 210, a first illumination system lens 221, a second illumination system lens 222, an image film 230, a spacer 240, a first image forming system lens 251, a second image forming system lens 252, and a third image forming system lens 253, and an opening o may be formed in the housing 210 at locations corresponding to the second illumination system lens 221 and the spacer 240, and a cover for opening or closing the opening o may be added.

The image film 230 and the spacer 240 are easily separated from the second illumination system lens 222 through the opening o, and a desired image film may be used by easily replacing the image film 230.

As described above, the puddle lamp device configured for displaying the image according to various exemplary embodiments of the present invention may minimize the color dispersion of the image by a combination of the image forming system lenses having different Abbe's numbers, and improve heat-dissipation performance, enhancing the resolution.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A puddle lamp device for displaying an image, the puddle lamp device comprising:
   a housing;
   an illumination system lens, an image film, and a plurality of image forming system lenses embedded in the housing, and sequentially arranged in a predetermined direction, wherein at least one image forming system lens among the plurality of image forming system lenses is made of a cycloolefin polymer (COP) material; and
   a spacer disposed between the illumination system lens and the plurality of image forming system lenses, and having the image film accommodated thereon,
   wherein an opening is formed in a side surface of the housing, and
   wherein the opening is formed at a location at which the spacer is configured to be separated from the housing.

2. The puddle lamp device of claim 1,
   wherein the plurality of image forming system lenses are three or more image forming system lenses, and
   wherein the plurality of image forming system lenses include: at least two image forming system lenses made of the COP material.

3. The puddle lamp device of claim 2,
   wherein the three or more image forming system lenses of the plurality of image forming system lenses include: a first image forming system lens, a second image forming system lens, and a third image forming system lens sequentially arranged in the predetermined direction away from the image film, and
   wherein the first image forming system lens is made of the COP material.

4. The puddle lamp device of claim 3,
   wherein the second image forming system lens is made of a PC material, and
   wherein the third image forming system lens is made of the COP material.

5. The puddle lamp device of claim 1,
wherein at least one image forming system lens among the plurality of image forming system lenses is made of a polycarbonate (PC) material.

6. The puddle lamp device of claim 1,
wherein the plurality of image forming system lenses are three or more image forming system lenses, and
wherein the plurality of image forming system lenses include: at least two image forming system lenses made of a PC material.

7. The puddle lamp device of claim 1,
wherein the illumination system lens is in plural to be a plurality of illumination system lenses made of a PC material.

8. The puddle lamp device of claim 1,
wherein the housing is made of a heat-dissipation plastic material to which a carbon-based additive is added.

9. A puddle lamp device for displaying an image, the puddle lamp device comprising:
a housing;
an illumination system lens, an image film, and a plurality of image forming system lenses embedded in the housing, and sequentially arranged in a predetermined direction, wherein at least one image forming system lens among the plurality of image forming system lenses is made of a cycloolefin polymer (COP) material; and
a spacer disposed between the illumination system lens and the plurality of image forming system lenses, and having the image film accommodated thereon,
wherein the spacer is formed with a rim portion extending from an external circumference of the spacer,
wherein the illumination system lens is formed with a spacer portion extending upwards from an external circumference of the illumination system lens, and
wherein the spacer portion is inserted into the rim portion.

10. A puddle lamp device for displaying an image, the puddle lamp device including:
a housing;
an illumination system lens, an image film, and a plurality of image forming system lenses embedded in the housing, and sequentially disposed in a predetermined direction, wherein the plurality of image forming system lenses include: at least one image forming system lens having an Abbe's number different from an Abbe's number of other image forming system lenses among the plurality of image forming system lenses; and
a spacer disposed between the illumination system lens and the plurality of image forming system lenses, and having the image film accommodated thereon,
wherein an opening is formed in a side surface of the housing, and
wherein the opening is formed at a location at which the spacer is configured to be separated from the housing.

11. The puddle lamp device of claim 10,
wherein the plurality of image forming system lenses include: at least two image forming system lenses made of a COP material.

12. The puddle lamp device of claim 11,
wherein the plurality of image forming system lenses include: a first image forming system lens, a second image forming system lens, and a third image forming system lens sequentially disposed in the predetermined direction away from the image film, and
wherein the first image forming system lens is made of the COP material.

13. The puddle lamp device of claim 10,
wherein the plurality of image forming system lenses include: an image forming system lens made of a polycarbonate (PC) material and an image forming system lens made of a cycloolefin polymer (COP) material.

14. The puddle lamp device of claim 10,
wherein the housing is made of a heat-dissipation plastic material to which a carbon-based additive is added.

* * * * *